UNITED STATES PATENT OFFICE.

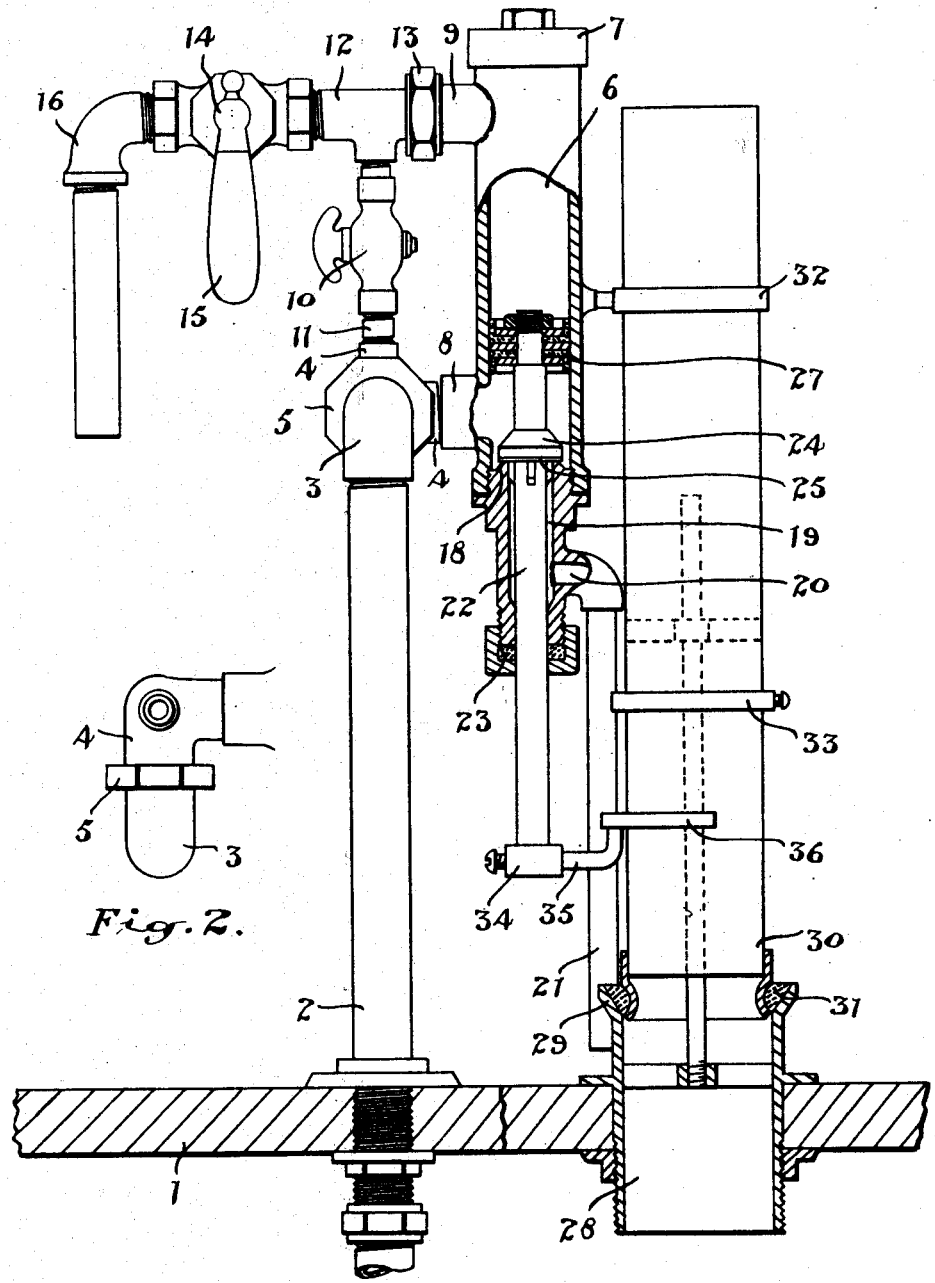

WILLIAM J. CALLOW, OF TORONTO, ONTARIO, CANADA.

FLUSH-TANK CONTROL.

1,207,854.

Specification of Letters Patent.   Patented Dec. 12, 1916.

Application filed February 24, 1916. Serial No. 80,131.

*To all whom it may concern:*

Be it known that I, WILLIAM JOHN CALLOW, a subject of the King of Great Britain, and resident of the city of Toronto, county of York, Province of Ontario, in the Dominion of Canada, have invented certain new and useful Improvements in Flush-Tank Controls, as described in the following specification and illustrated in the accompanying drawings, that form part of the same.

The principal objects of the invention are, to eliminate the undesirable noise in the refilling of flush tanks, and to obviate the annoyance, inconveniences and expense due to the present forms of valves getting out of order.

A further object is to devise a very simple and effective construction of control which eliminates the objectionable and uncertain float valve.

The principal feature of the invention consists in the novel construction and arrangement of parts, whereby the release of the water from the tank and the refilling of the tank is governed by a member actuated by the pressure of the water entering the tank.

In the accompanying drawings, Figure 1 represents an elevational part sectional view of my improved control apparatus arranged within the tank. Fig. 2 is a plan view of the coupling connection between the water inlet pipe and my improved device.

Like numerals of reference indicate corresponding parts in each figure.

Referring to the drawings, 1 is the bottom of the flush tank.

2 is the water supply pipe, here shown extending upwardly from the bottom of the tank being rigidly secured therein and having at its upper end a coupling elbow 3.

4 is a three-way L connection secured to the elbow 3 by the coupling nut 5.

6 is a cylindrical chamber closed at the upper end by a cap 7 and having a branch 8 extending laterally therefrom adjacent to the lower end and connected to the L-connection 4 and branch 9 extending laterally from the upper end.

10 is an adjusting cock connected to the upper connection 11 of the three-way L 4 and communicating with a T 12 which T is connected at one end to the branch 9 by a coupling nut 13.

14 is a self-closing cock secured to the other end of the T 12 having a handle 15 secured to the stem thereof, said handle being arranged outside of the tank.

16 is an elbow and pipe length secured to the outer end of the cock 14 turned downwardly and adapted to have the lower end immersed in the water of the tank.

18 is a valve seat threaded into the lower end of the cylinder 6 having a central passage 19 opening through the top and communicating with a lateral passage 20 arranged adjacent to the bottom, which passage 20 is turned downwardly and provided with an extension pipe 21 leading to a point close to the bottom of the tank.

22 is a valve stem slidably arranged in the lower end of the member 18 and extending upwardly through the central passage 19, a clear passage being left between the stem and the inner wall of the passage 19.

23 is a packing gland secured to the lower end of the member 18 and encircling the stem 22.

24 is a valve arranged upon the stem 22, preferably having a rubber under-surface 25 to engage the valve seat 26. The valve 24 is arranged when closed about opposite the lower side of the branch 8 from the cylinder 6.

27 is a double cupped washer piston secured upon the upper end of the valve stem 22 and fitting the interior of the cylinder 6. The piston 27 is adapted to operate in the cylinder 6 and to carry the valve 24 with it and thus open the passage 19 to the flow of water from the main allowing it to pass downwardly through the said passage 19 and 20 and extension pipe 21 into the tank.

The pressure of water from the supply pipe 2 enters the cylinder 6 between the piston 27 and valve 24 and thus effects a balancing. The pressure also extends through the adjusting cock 10, T 12 and upper connection 11 to the upper end of the cylinder 6. The area of the upper end of the piston exposed to pressure exceeds that of the lower side of the piston, consequently the pressure exerted holds the valve 24 to its seat closing the flow to the tank.

28 is the cylindrical waste connection secured in the tank bottom 1 and extending upwardly a short distance within the tank and having the outwardly flared valve seat 29 at the top.

30 is a tubular valve member having a rubber valve gasket 31 arranged upon its lower end and resting in the valve seat 29. The tubular valve extends upwardly to a point adjacent to the top of the valves arranged within the tank and is held in a perpendicular position by the ring guide 32 carried by the cylinder 6 and by the interior guide rod 32ª.

33 is a ring adjustably arranged upon the valve 30.

34 is a ring adjustably secured upon the lower end of the valve stem 22 having a laterally extending arm 35 formed with a semi-circular end piece 36 which is adapted to partially encircle the tubular valve 30 and to engage the ring 33 upon the rising of the piston.

In the operation of this device the water flows into and fills the tank to the desired level. The inflow of water is regulated entirely by the adjustment of the adjusting cock 10 which allows the water to run in for a certain predetermined period and when it has expired the pressure of the water has filled the cylinder 6 above the piston and the communicating passages and the valve 24 is thus closed by the pressure of the water.

When it is desired to empty the tank the handle 15 of the cock 14 is operated. Upon the opening of the cock 14 the pressure of the water within the cylinder 6 and its communicating passages 13 released and as the cock 14 and the elbow 16 are of considerably greater diameter than the adjusting cock, the return flow of water to the top end of the cylinder will be slow.

Immediately upon the release of the pressure within the upper end of the cylinder 6 the pressure against the lower end of the piston causes the piston and piston rod to travel upwardly, the movement being cushioned by the outflowing water released by the opening of the cock 14. The upward movement of the piston raises the valve 24 from its seat and opens the passage for the inflow of water to the tank. Simultaneously the arc-shaped end of the arm 35 carried upon a ring 34 secured to the lower end of the valve stem moves upwardly and engaging the ring 33 upon the tubular valve 30 lifts the said valve and opens the waste vent, thus allowing the water in the tank to escape quickly.

Upon the release of the handle of the self-closing cock 14 a pressure is again established in the upper end of the cylinder 6 and such pressure overbalancing the pressure against the underside of the piston causes the piston to move in the return downward direction. The downward movement of the piston allows the return of the tubular valve 30 to its seat. The period of return may be regulated as desired by adjusting the ring 33 upon the valve and the collar 34 upon the piston rod. By this adjustment the space between the member 36 and the ring 33 may be regulated as desired so that the waste valve is not opened until the piston reaches a point adjacent to the head of the cylinder and raises the valve only a sufficient distance to allow of the free escape of the water from the tank. The first downward movement of the piston thus returns the valve and the piston then continues its slow downward movement and eventually closes the valve 24 against its seat to shut off the inflow of water to the tank. The inlet to the tank is under restraint until the proper amount of water has been allowed to flow in and the flow is then cut off quickly. This eliminates all noise in the refilling of the tank. In the event of any accidental leakage of water past the valve 24 no harm will result as the upper end of the tubular valve 30 is open and consequently the water will overflow and simply run down the waste.

The mechanism herein described is very simple and compact. It is all firmly connected together and so arranged that upon disconnecting the coupling nut 5 the whole device can be lifted out of the tank for examination or repair. There are no bearings to get out of alinement; no rods, floats and other loose members to get out of shape or out of order, consequently the danger of the device getting out of repair is reduced to the minimum in addition to the features hereinbefore referred to.

It will be noted that the outflow of water has no effect whatever upon the mechanical action of the return of the valve 30 to its seat to close the outlet but the closing of the outlet is so timed that before the water in the tank has fallen to the level of the top outflow the valve will have closed a sufficient distance to check the outflow to the extent that there will not be sufficient water flowing through to continue the flush of the closet bowl, consequently the siphon will be broken and the remaining quantity of water will flow out of the tank and act as a refill to the bowl.

What I claim as my invention is:—

1. In a flush tank control, the combination with the pressure water supply to the tank, a valve closing said supply and a valve for releasing the water from the tank, of a hydraulically operated member operated by the pressure of water from the supply, means connected to said hydraulic member and operatively engaging the water supply controlling valve and said release valve and adapted to successively open the water supply valve and said release valve, and manually operated means for controlling said hydraulically operated means.

2. In a flush tank control, the combination with the pressure water supply to the tank, a valve closing said supply and a valve for releasing the water from the tank, of a hydraulically operated member operated by the pressure of water from the supply and operatively connected to the water supply controlling valve, an arm secured to said hydraulically operated member adapted to engage and lift said release valve following the opening of the water supply valve and to close said release valve prior to the closing of the water supply valve, and means for controlling said hydraulically operated member.

3. In a flush tank control, the combination with the water supply and water outlet from the tank, of a valve closing the outlet, a reciprocating member adapted to lift said valve to release the water from the tank, hydraulic operated means connected with the water supply for operating the said reciprocating member to lift the valve, means for overbalancing the lifting hydraulic pressure on said reciprocating member and to allow the closing of the release valve, and means operated by said reciprocating member for controlling the inflow of water to the tank.

4. In a flush tank control, the combination with the water supply, of a cylinder having ports at each end connected with the water supply, a piston operating in said cylinder between said ports, a piston rod secured to said piston, an outlet to the tank, a valve closing said outlet, means secured to said piston rod for lifting said outlet valve, a valve carried by said piston rod for closing the water supply, and means for controlling the pressure at the outer end of the cylinder to effect the return movement of the said piston to allow the closing of the outlet valve and to close the water supply to the tank.

5. In a flush tank control, the combination with the water supply, of a cylinder having ports at each end connected with the water supply, means interposed between one port and the water supply for regulating the flow of water to the corresponding end of the cylinder, manually operated means connected with said port for releasing the pressure in the said end of the cylinder, a piston operating in said cylinder, a piston rod connected to said piston, a valve seat surrounding said piston rod, a valve on said piston rod adapted to engage said valve seat to close the water supply to the tank, an outlet valve adapted to release the water from the tank, and means carried by said piston rod for operating said outlet valve.

6. In a flush tank control, the combination with the water supply, of a cylinder having ports at each end connected with the water supply, a member closing one end of said cylinder having a centrally arranged orifice forming a communicating passage for the water supply to the tank and a valve seat surrounding said orifice, a valve spindle of lesser diameter than said orifice slidably arranged therein, a valve secured to said spindle and adapted to close against said seat, a piston secured to the said valve spindle within the cylinder, means interposed between the water supply and the end of said cylinder opposite to the end having the valve seat for regulating the flow of water thereto, manually operated means for releasing the pressure in the corresponding end of the cylinder, an outlet valve adapted to release the water from the tank, and means secured to said piston rod for operating said outlet valve.

7. In a flush tank control, the combination with the water supply, of a cylinder having ports at each end connected with the water supply, a regulating cock arranged between the water supply and the one end of the cylinder, a piston operating in the cylinder, a valve carried by said piston adapted to open and close the passage of water to the tank, an outlet valve adapted to release the water from the tank, means operated by said piston for operating said outlet valve and manually operated means for releasing the pressure on the end of said piston opposite to the end carrying the valve.

8. In a flush tank control, the combination with the water supply, of a cylinder having ports at each end connected with the water supply, means interposed between the port at one end of the cylinder and the water supply for regulating the flow of water to the corresponding end of the cylinder, a valve connected with the said corresponding end of the cylinder adapted to release the pressure therein, a piston operating in the cylinder, a valve connected with said piston adapted to close the water supply to the tank, an outlet valve adapted to release the water from the tank, and means operated by said piston for operating said outlet valve.

9. In a flush tank control, the combination with the water supply, of a cylinder having ports at each end connected with the water supply, a piston and piston rod operating in said cylinder, means operated by said piston for controlling the supply of water to the tank, means for controlling the operation of said piston, an outlet valve in the bottom of the tank, a tubular valve member closing upon said oulet valve seat, means supported by said cylinder for guiding said tubular valve, and means operated by said piston for lifting said valve.

10. In a flush tank control, the combination with the water supply, of a cylinder having ports at each end connected with the water supply, a piston and piston rod operating in said cylinder, means operated by said piston for controlling the supply of water to the tank, means for controlling the operation of said piston, an outlet valve in the bottom of the tank, a tubular valve member closing upon said outlet valve seat, a circular guide encircling said valve and being rigidly secured to said cylinder, a ring adjustably secured upon the exterior of said valve intermediate of its length, an arm connected to the piston rod and having an extension member adapted to engage the ring on said valve to lift said valve upon its seat to effect the release of the water in the tank.

11. In a flush tank control, the combination with the water inlet pipe and a valve seat surrounding the outlet from the tank, of a cylinder connected with said inlet pipe, a piston operating in said cylinder, an outlet valve adapted to rest upon said valve seat to close the outlet and supported from said cylinder and operatively connected with the piston, an inlet valve operated by said piston, and means supported from said cylinder for controlling the operation of the piston.

12. In a flush tank control, the combination with a water supply pipe extending within the tank and the outlet arranged adjacent thereto, of a cylinder having ports at each end and pipe connections leading to said ports and having a common inlet, said common inlet being detachably connected to said water supply pipe, a piston operating in said cylinder and adapted to control the inflow of water to the tank, a valve closing the outlet slidably supported from said cylinder and operatively connected with said piston, and means connected with said cylinder and carried thereby for effecting the operation of said piston the whole forming a unitary structure adapted to be removed from the tank upon disconnecting the single connection to the water supply pipe.

WILLIAM J. CALLOW.

Copies of this patent may be obtained for five cents each, by addressing the "Commissioner of Patents, Washington, D. C."